United States Patent [19]

Bheda et al.

[11] Patent Number: 4,943,855
[45] Date of Patent: Jul. 24, 1990

[54] PROGRESSIVE SUB-BAND IMAGE CODING SYSTEM

[75] Inventors: Hemant Bheda, Freehold; Adrianus Ligtenberg, Oceanport, both of N.J.

[73] Assignee: AT&T Bell Laboratories, Murray Hill, N.J.

[21] Appl. No.: 222,987

[22] Filed: Jul. 22, 1988

[51] Int. Cl.$^5$ .............................................. H04N 7/13
[52] U.S. Cl. ..................................... 358/133; 358/135; 358/136
[58] Field of Search ................ 358/133, 138, 135, 136, 358/140, 141, 426

[56] References Cited

U.S. PATENT DOCUMENTS

| | | | |
|---|---|---|---|
| 4,663,660 | 5/1987 | Fedele et al. | 358/133 X |
| 4,831,636 | 5/1989 | Taniguchi et al. | 358/133 |
| 4,864,396 | 9/1989 | Martens | 358/133 |
| 4,870,497 | 9/1989 | Chamzas et al. | 358/133 X |
| 4,873,577 | 10/1989 | Chamzas | 358/133 X |

OTHER PUBLICATIONS

*IEEE Transactions on Communications,* vol. COM-25, No. 11, Nov. 1977, "Adaptive Coding of Monochrome and Color Images," W. Chen et al., pp. 1285–1292.
*The Bell System Technical Journal,* vol. 55, No. 8 10/76, "Digital Coding of Speech in Sub-Bands", R. E. Crochiere et al., pp 1069–1085.
*IEEE Transactions on Acoustics, Speech, and Signal Processing,* vol. ASSP-34, No. 5, 10/86, "Subband Coding of Images", J. W. Woods et al., pp. 1278–1279.
SPIE vol. 707 Visual Communications and Image Processing, 1986, "Sub-Band Coding of Digital Images Using Two-Dimensional Quadrature Mirror Filtering", H. Gharavi et al., pp. 51–61.

*Primary Examiner*—James J. Groody
*Assistant Examiner*—Victor R. Kostak
*Attorney, Agent, or Firm*—Henry T. Brendzel

[57] ABSTRACT

A system for reducing image data redundancies through progressive sub-band coding. The image is separated into a selected plurality of sub-bands, and the sub-band with the largest non-redundant data content is chosen and used to predict the data in the other sub-bands. Only prediction error information of the predicted sub-bands encoded and transmitted together with the encoded chosen sub-band. An overall performance error signal can also be evaluated at the encoder's end and used to further improve performance. The sub-band encoding can be performed recursively to still further reduce the encoded data.

13 Claims, 4 Drawing Sheets

PROGRESSIVE SUB-BAND IMAGE CODING SYSTEM

BACKGROUND OF THE INVENTION

This invention relates to image processing and more particularly to encoding of images in a manner that would permit transmission and/or storage of image information in the most efficient manner.

With the advent of wideband electronic transmission capabilities (such as the AT&T ISDN), the wide spread installation of personal computers, and the ever increasing power of work stations, we are entering a new area where the manipulation of large amounts of digital pictorial information has become feasible. To simplify communication of pictorial data, a serious international effort is underway to standardize on algorithms for compression of both still pictures and active video (ISO/CCITT).

Different compression methods have evolved in the art as understanding of pictorial data increased and theoretical advances were made. Differential Pulse Code Modulation (DPCM) and bit-plane coding were among the early methods used, and they achieved compression factors of up to 4-6 by trading image quality for lower bit rate. Pictures with higher quality than obtainable with DPCM, coded with only one bit per pixel, can now be obtained with a number of methods, such as the Adaptive Discrete Cosine Transform (ADCT) described by W. H. Chen and C. H. Smith, in "Adaptive Coding of Monochrome and Color Images", IEEE Trans. Comm., vol. COM-25, pp. 1285-1292, November 1977. In an ADCT coding system, the image is decomposed into blocks, generally eight by eight, and for each of the blocks a DCT (Discrete Cosine Transform) is carried out. The compression is obtained by quantization of the DCT coefficients with variable thresholds, optimized for the human visual acumen, followed by variable word length encoding.

In the context of speech, compression has been achieved by the use of sub-band coding techniques, as described, for example, by R. E. Crochiere, et al. "Digital Coding of Speech in Sub-Bands," Bell. Syst. Tech. J., vol. 55, pp. 1069-1085, October 1976. The speech sub-band coding technique consists of decomposing the signal into separate frequency bands and coding the outputs of the different bands according to their energy levels.

Borrowing from the speech area, sub-band coding of images have been introduced to picture coding. One arrangement was proposed by J. W. Woods and S. D O'Neil, in "Sub-Band Coding of Images", IEEE ASSP, vol. ASSP-34 No. 5, October 1986, pp. 1278-1288. The arrangement proposed by Woods at el. includes a filter bank, that divides the image signal into bands of different frequency content, and the signal of each filter output is compressed via DPCM. The compressed signals are then transmitted to a receiver where the process is reversed. Specifically, each signal is DPCM decoded and then up-sampled, filtered, and combined with the other filtered signals to recover the original image.

H. Gharavi and A. Tabataba in "Sub-Band Coding of Images Using Two-Dimensional Quadrature Mirror Filtering," Proc. SPIE, vol. 707, pp. 51-61, September 1986, use long complex quadrature mirror filters to obtain a number of frequency band signals. The "low-low" band is DPCM coded using a two-dimensional DPCM codec. A dead-zone quantizer is used for the other bands, followed by PCM coding.

Other sub-band coding schemes such as proposed by P. H. Westerink, J. W. Woods and D. E. Boekee in Proc. of Seventh Benelux Information Theory Symposium, pp. 143-150, 1986, apply vector-quantization techniques to code the filter bank outputs.

Up to now, however, sub-band coding techniques did not achieve the image quality and compression ratios obtained with other methods. This is mainly due to the interband correlation that is present in the signal, but that is not removed by the prior art techniques. Another major problem with some of the sub-band coding approaches is the cost of the computations of long complex filters.

SUMMARY OF THE INVENTION

To overcome the deficiencies of the prior art, the instant invention employs the data redundancies available in the different sub-band signals to reduce the transmitted code to a much greater degree than heretofore was possible. Specifically, our invention contemplates a communication system having a transmission medium to which a coder is connected at the transmitter's end, and a corresponding decoder is connected at the receiver's end. The coder employs a filter bank, not unlike a filter bank that Woods et al. suggests, but in accordance with our invention, the sub-band with the largest amount of energy is used to help in encoding of the other sub-bands. This sub-band is, of course, also encoded to reduce the output signal as much as possible. The help that the selected sub-band provides to the encoding process of the other sub-bands is in the form of predicting the values of the sub-bands, comparing the prediction to the actual values, and coding only the difference. The decoder operates in the reverse manner.

In a different embodiment of our invention, when it is desired to enhance the transmission still further, the encoded signals that are normally transmitted are captured within the transmitter, decoded, and compared to the source signal. Discovered differences are then also encoded and transmitted to the receiver.

In a still further realization of our invention, the principle of separating the signal into sub-bands and using one of the sub-bands to help in the encoding of the other sub-bands is used iteratively. Specifically, the sub-band that contains the largest amount of energy is broken up into secondary sub-bands and the secondary sub-band with the largest amount of energy is used in the coding of the other secondary sub-bands. The iterative process can be repeated as many times as desired.

In transmitting the information developed in accordance with the principles of our invention another benefit accrues from the ability to achieve progressive transmission by first sending the sub-band that contains the most information. Users on the receiving end can quickly discover what image is being received, and, if desired, they can cause the transmission to be halted, thereby saving time, processing effort, and channel capacity.

DETAILED DESCRIPTION

Figure 1:
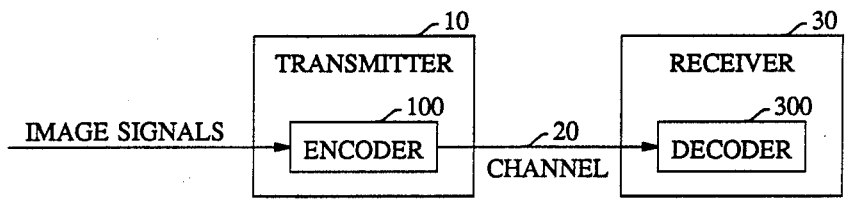
FIG. 1 presents a general block diagram of a system employing the principles of our invention.

FIG. 1 illustrates the basic communications system for practicing our invention. It includes a transmitter 10 within which there is an encoder 100 that is connected to a transmission channel 20. Channel 20 is connected to receiver 30, and within receiver 30 there is decoder 300 which is responsive to the signals flowing over channel 20. It should be understood, of course, that communication channel 20 is taken in its broadest sense, and it specifically includes a storage medium, such as a CDROM. That is, rather than sending encoded signals to a receiver in "real time", one can store the signals within the "channel", and supply them to the user at some other time, upon request. This concept encompasses, of course, situations that are not traditionally thought of as "communicating"; such as when the "transmitter" is a record manufacturer, the transmission "medium" is a purchased record, and the "receiver" is the "play-back" mechanism in the purchaser's home.

Figure 2:
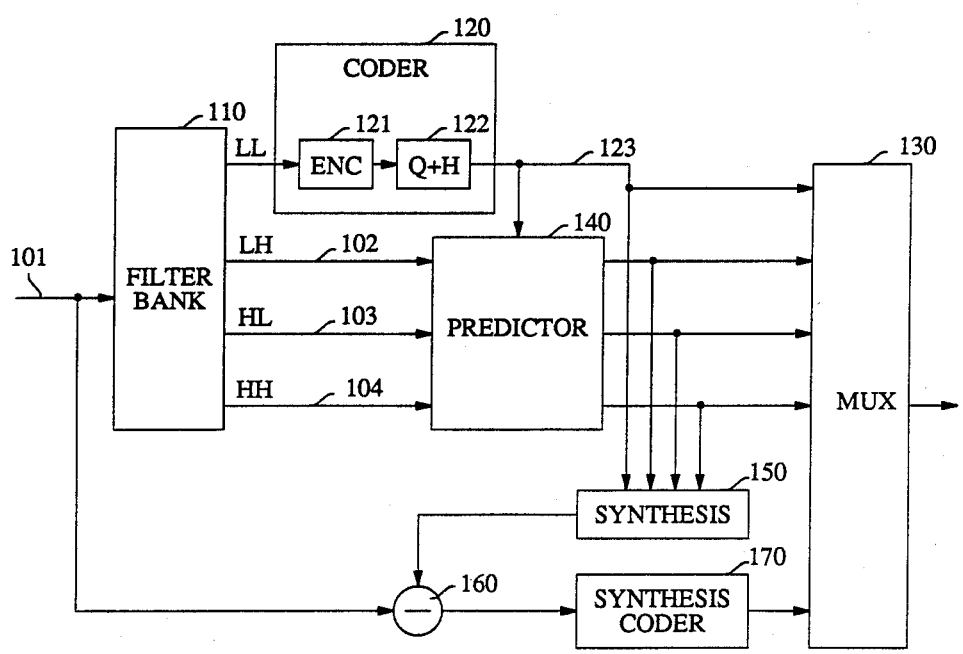
FIG. 2 depicts the block diagram of encoder 100 within the system of FIG. 1.

FIG. 2 depicts a block diagram of encoder 100. It includes a filter bank block 110 to which the image signal is applied. The image signal can have any number of formats, and the standard raster format for two dimensional images is an acceptable one. In FIG. 2, filter bank 110 has four outputs, but it is understood that this can be any number greater than 1. These correspond to the four possible signals of an image that was filtered into a high band and a low band in both the horizontal dimension and vertical dimension. That is, two images are obtained by passing the image through a "horizontal low pass filter" and a "horizontal high pass filter". By passing each of the two developed images through a "vertical low pass filter" and a "vertical high pass filter", four images are obtained. We call these four images the HH, HL, LH, and LL images.

We have discovered that for most scenic images, as contrasted with images comprising merely lines, the LL image (low pass filtered both horizontally and vertically) contains the bulk of the relevant visual information. We have further discovered that, with proper filters in filter bank 110, there is a high degree of correlation between the LL image and the other three images.

Utilizing the above, FIG. 2 includes a coder 120 that is responsive to the LL image. Coder 120 encodes the LL image and aplies it to the transmission channel through multiplexer circuit 130. The very same signal is also fed to predictor coder block 140. The function of coder 120 is to compress the data from the LL band. This can be done in various ways, and the exact way by which that is done is of little importance to the principles of our invention. For purposes of illustration, however, FIG. 2 shows a coder 120 that contains a DCT block 121 followed by block 122 that includes a quantizer and a Huffman encoder. Block 121 performs the discrete cosine transform on the filtered LL signal. The result that is obtained describes the LL signal more efficiently because it removes a lot of the redundancy that is present within the signal. Following block 121, the quantizer within block 122 reduces the number of different outputs that must be handled (lower dynamic range) and the Huffman coding encodes the outputs in a reduced number of bits. DCT block 121 can be constructed in conventional manner, and the Huffman coding can also be implemented in conventional manner, e.g., with a look-up table.

Block 140 in FIG. 2 is a responsive to the HL, LH, and HH image signals on lines 102, 103, and 104, as well as to coder 120 signal on line 123. Predictor coder block 140 develops an estimate for each of the three image signals applied to it (HL, LH, and HH), compares the estimate to the actual signal, and encodes the difference found in the comparison. The encoded difference signals are applied to multiplexer 130.

We have found that our technique, as described above in connection with FIG. 2, results in very high quality transmission of images at a substantially reduced bandwidth. Still further improvement is possible, however, when the remaining three blocks in FIG. 2 are used; to wit, blocks 150, 160, and 170. For applications where an enhanced transmission is desired, synthesis block 150 taps the previously described four signals sent to multiplexer 130 and decodes those signals. The output of synthesizer 150 is the decoded version of the signals applied by blocks 120 and 140 to the transmission channel, and is very close to the input image signal at line 101. This output signal is compared to the applied image signal of line 101 in subtracter 160, and the results of the comparison are applied to synthesis coder 170. Synthesis coder 170 transmits to multiplexer 130 information concerning the measure of error left in the encoding process of elements 110, 120 and 140.

Figure 3:
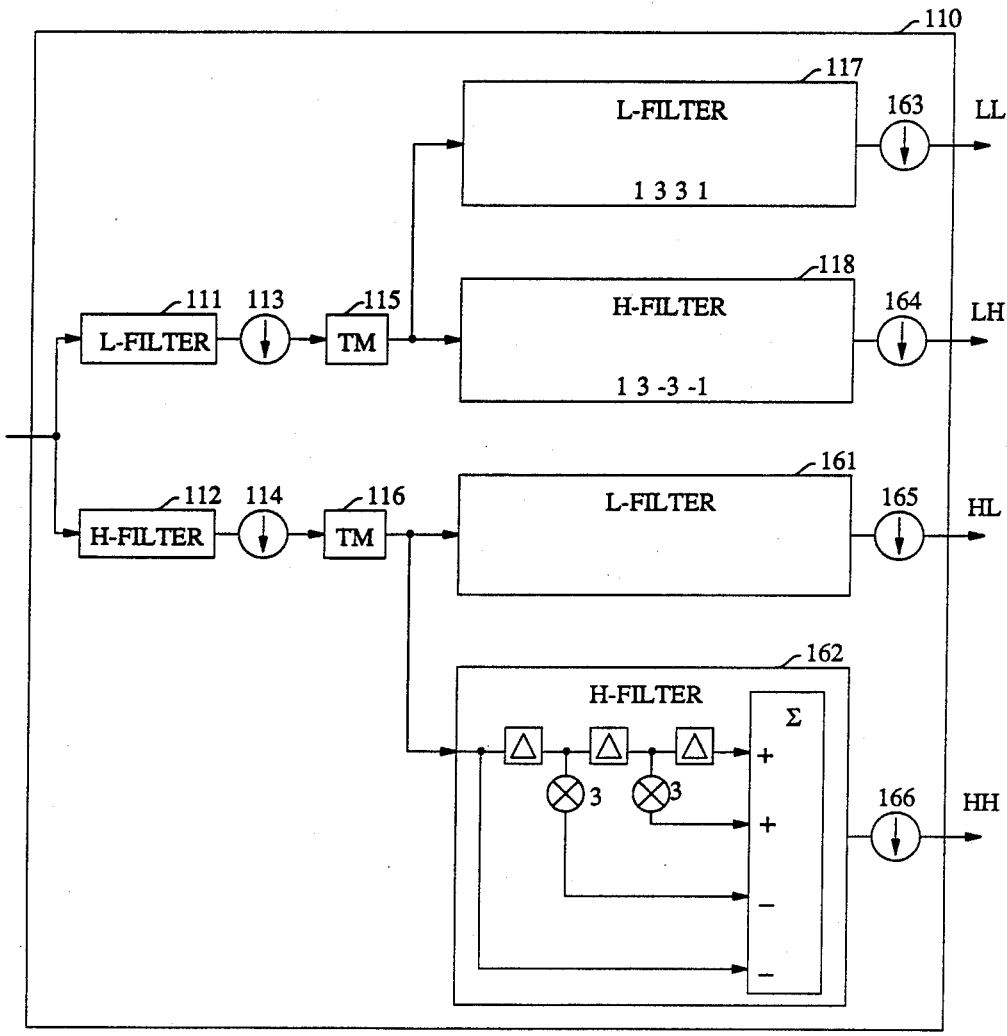
FIG. 3 details the structure of filter bank 110.

The filter bank (110) is charged with the responsibility of developing the four image signals LL, LH, HL, and HH. FIG. 3 illustrates one manner by which this can be accomplished for a raster scan input. The applied input signal is connected to a low pass filter 111 and a high pass filter 112. Advantageously, the outputs of the filters can be conventionally subsampled and, to that end, subsampling switches 113 and 114 are shown to be responsive to filters 111 and 112, respectively. Sub-sampling can be accomplished, for example, by ignoring every other sample, while up-samping can be accomplished by repeating a given sample. The output of switches 113 and 114 are applied to transpose memories 115 and 116 that transpose the pixel signals of the two dimensional image in the manner of transposing matrices. Transpose memories 115 and 116 are conventional memories where signals are stored in one way (following rows) but accessed in a different way (following columns). Such memory arrangements are well known in the art. For sake of completeness, however, the following simple implementation is suggested. To obtain transposition, one may use an address counter and a memory responsive thereto, with a logic circuit interposed therebetween. The logic circuit allows for interchange of a number of least significant bits of the counter with higher significance bits of the counter. A normal sequence is thus obtained without the interchange of bits, and the transposed sequence is obtined by interchanging the bits.

The output of memory 115 is applied to low pass filter 117 and to high pass filter 118. Similarly, the output signal of memory 116 is applied to filters 161 and 162. The outputs of filters 117, 118, 161, and 162 are applied, respectively, to subsamplers 163, 164, 165, and 166, which produce the LL, LH, HL, and HH outputs of filter bank 110. The filters themselves can be implemented with short and simple finite impulse response (FIR) filters. A typical set of filter coefficients is [1,3,3,1] for the low pass filters (111, 117, and 161) and

[1,3,−3,−1] for the high pass filters (112, 118, and 162). These filters can be implemented with shift register stages, multipliers composed of shift and add stages, and an adder. To obtain a good correlation factor in the four sub-bands which would allow for efficient prediction by the chosen sub-band, it is desirable to have the filters not very sharp. There should be some overlap in the filters' bands, but happily, that condition merely relaxes the requirements on filter realizations. As can be observed from the above, our filters comprises merely four stages and rather simple coefficients.

Figure 4:
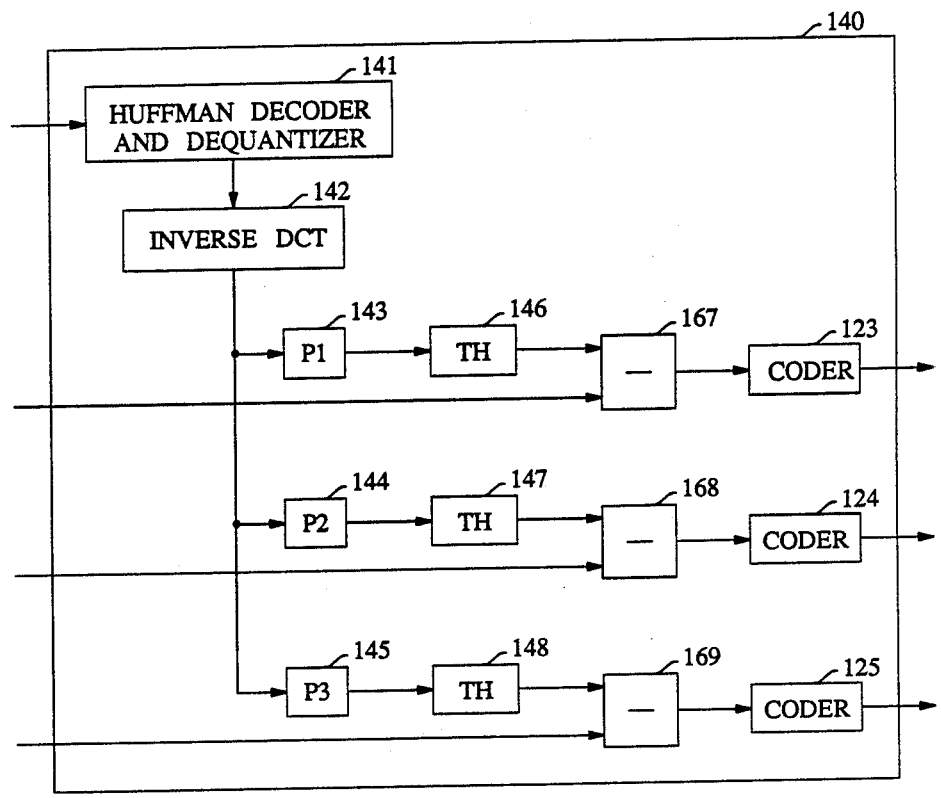
FIG. 4 presents one embodiment of predictor 140.

FIG. 4 presents a block diagram of predictor block 140. The output signal of coder 120 is applied via line 122 to Huffman decoder and dequantizer block 141; and the output of block 141 is applied to inverse DCT block 142. Blocks 142 and 141 reverse the operations of blocks 121 and 122, respectively. The result is the filtered signal LL, which is in the format of signals LH, HL, and HH. The output of block 142 is applied to filters 143, 144, and 145. These filters aim to predict the signals of the LH, HL, and HH bands, and since these bands contains primarily the edge information of the image, these filters are, basically, edge detectors. The edge detection can be effected with very simple two dimensional FIR filters with coefficients such as $$[1, 0, -1]$$
$$[2, 0, -2]$$
$$[1, 0, -1]$$

Figure 5:
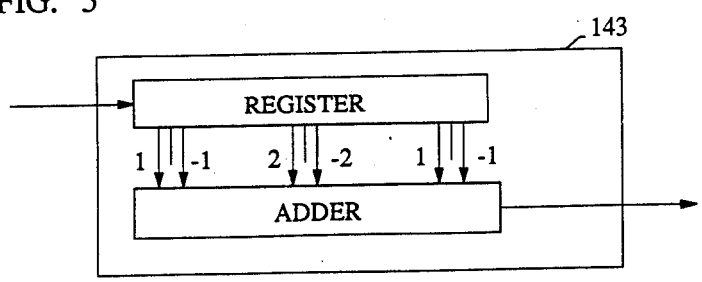
FIG. 5 illustrates a simple embodiment of a two dimensional filter for the predictor block.

Such filters can be implemented with a shift register that is long enough to hold the information of three scan lines, coupled with appropriate multiplication and summing network, as shown, for example, in FIG. 5. Filters 143-145 can also be implemented with a FIR filter like filter 111 in FIG. 3, followed by a transpose memory which, in turn, is followed by another FIR filter. With the latter embodiment, the filter coefficients for filter element 143 are [1,2,1] and [1,0,−1]; the filter coefficients for filter element 144 are [1,0,−1] and [1,2,1]; and the filter coefficients for filter element 143 are [1,0,−1] and [1,0,−1].

The outputs of filters 143, 144, and 145 are applied to threshold circuits 146, 147, and 148, respectively, and the outputs of threshold circuits 146, 147, and 148 are applied to comparators 167, 168, and 169, respectively. The threshold circuits, which may or may not include amplification or attenuation means, aim to approximate the amplitude of the prediction signals to the incoming LH, HL, and HH signals, and to eliminate spurious responses from the filters. In the ultimate, the output of the threshold circuits can even be truncated to 1's and 0's. The LH, HL, and HH signals are also applied to the comparators, but through delay means 126, 127 and 128. The delay is necessary to compensate for the delay in the signal path from the LL output of filter bank 110 to the signal output of the threshold circuits. The output signals of comparators 167, 168, and 169 are applied to coders 123, 124, and 125, respectively, which can be constructed in a manner that is similar to the construction of coder 120. The outputs of coders 123, 124, and 125 comprise the output of predictor coder block 140.

Synthesis block 150 simply reverses the encoding process. Its detailed description is reserved for the decoder discussion that follows. Suffice it to say that the output of synthesizer 150 approximates the input to filter bank 110. The output of synthesizer 150 is applied to subtracter 160, and the subtraction result is applied to synthesis coder 170. Synthesis coder 170 can be constructed in a manner that is similar to that of coder 120.

Multiplexer 130 may be a conventional multiplexer. Its function is to allocate the samples developed by blocks 120, 140, and 170 to the communication channel. Its design can follow any conventional approach, and therefore, it is not discussed here in detail.

Figure 6:
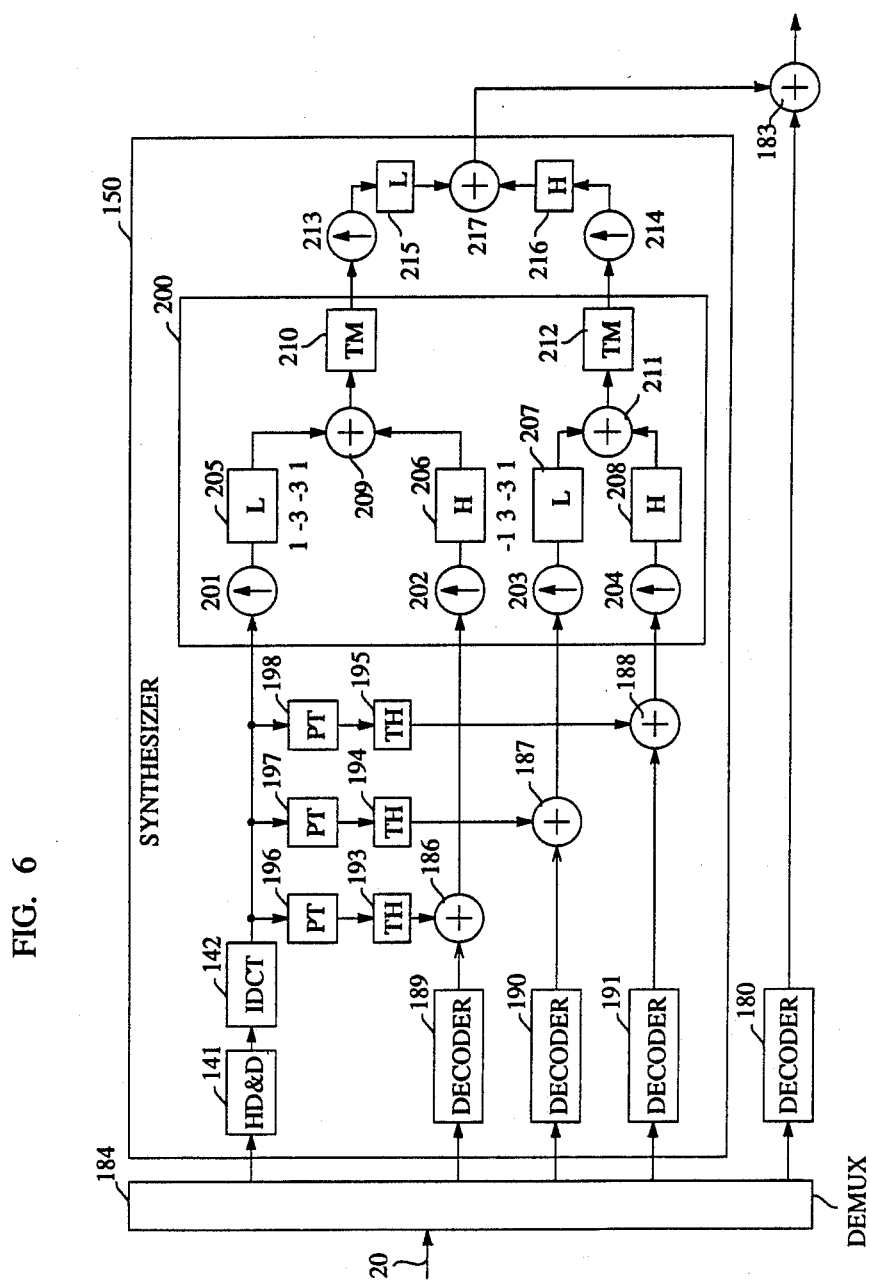
FIG. 6 depicts a block diagram of decoder 300 of FIG. 1.

FIG. 6 depicts a block diagram of decoder 300, which includes demultiplexer 184, synthesizer 150, decoder 180, and adder 183. The signal of channel 20 is applied to demultiplexer 184, where five signals are developed that correspond to the five signals that are combined in multiplexer 130. These are the encoded LL, LH, HL, and HH signals and the encoded error-correcting signal of synthesis coder 170. The first four signals (LL, LH, HL, and HH) signals are applied to synthesis block 150, whereas the fifth signal is connected to decoder 180.

Within synthesis block 150 the LH, HL, and HH signals are applied to decoders 189, 190, and 191, respectively, while the encoded LL signal is applied to a Huffman decoder and dequantizer 141, followed by inverse DCT block 142. Decoders 189-191 are similar in construction to but reverse the operation of coders 123-125, respectively. They also include a delay to equalize the delay in the signal flow between the coders and subsequent circuits and the inverse DCT signals that feed those other circuits, as described below. This arrangement is very similar to the arrangement of the corresponding blocks in predictor block 140. The output of block 142 is applied to filters 196, 197, and 198 and the outputs of those filters are connected to threshold circuits 193, 194, and 195, respectively. Filters 196-198 and circuits 193-195 are similar to filters 143-145 and circuits 146-148 of FIG. 4, respectively.

The output of threshold circuit 193 is connected to adder 186 and the output of decoder 189 is also connected to adder 186. Similarly, circuit 194 and decoder 190 are connected to adder 187, and circuit 195 and decoder 191 are connected to adder 188.

The output signals of inverse DCT circuit 142 and the output signals of adders 186-188 are applied to combining circuit 200. Within combining circuit 200, the signals are up-sampled in up-samplers 201-204, filtered and combined. Specifically, after up-sampling, the signal of block 142 is applied to a low pass filter (205), the signal of adder 186 is applied to a high pass filter (206), the signal of adder 187 is applied to a low pass filer (207), and, lastly, the signal of adder 188 is applied to a high pass filter (208). Still within combining network 200, the output signal of filters 205 and 206 are applied to an adder (209) and then to transpose memory 210. Similarly, the output signals of filters 207 and 208 are applied to an adder (211) and then to transpose memory 212. The output of memories 210 and 212 are up-sampled again in elements 213 and 214, and respectively passed through a low pass filter (215) and a high pass filter (216). The signal sum of the outputs of filters 215 and 216 is developed in adder 217, which provides the output of combining block 200 and the output of synthesis block 150.

Filters 205-208 and 215-216 are each three stage filters. The coefficients of the low pass filters is [1,−3,−3,1] and the coefficients of the high pass filters is [−1,3,−3,1].

In applications where the transmissionn side does not use synthesis coder block 170, the output of block 150 in decoder 300 forms the output of the decoder. In applications where synthesis coder 170 is used, decoder 300 includes decoder block 180 and adder block 183 that is responsive to the output of decoder 180 and block 150.

In those circumstances, the output of adder 183 forms the output of decoder 300.

We claim:

1. An image encoder comprising:
   filter bank means responsive to an applied image signal for developing a plurality of sub-band image signals;
   coder means responsive to a selected one of said sub-band image signals for encoding said selected sub-band image signal to reduce data redundancy contained in said selected sub-band image signal; and
   prediction means responsive to other ones of said sub-band image signals and to said means for encoding for developing predictive signals corresponding to said other sub-band image signals.

2. The encoder of claim 1 wherein said filter bank means develops sub-band image signals corresponding to different combinations of horizontal and vertical resolutions of said applied image signal.

3. The encoder of claim 1 wherein said filter bank means develops sub-band image signals corresponding to different combinations of horizontal and vertical frequency contents of said applied image signal.

4. The encoder of claim 2 wherein said filter bank means develops an HH sub-band image signal corresponding to a high vertical frequency contents and a high horizontal frequency contents, an HL sub-band image signal corresponding to a high vertical frequency contents and a low horizontal frequency contents, an LH sub-band image signal corresponding to a low vertical frequency contents and a high horizontal frequency contents, and an LL sub-band image signal corresponding to a low vertical frequency contents and a low horizontal frequency contents.

5. The encoder of claim 4 wherein said coder means is responsive to said LL sub-band image signal.

6. The encoder of claim 1 wherein said coder means comprises a variable length coding means for reducing the length of codes generated by said coder means.

7. The encoder of claim 6 wherein said coder means includes an orthogonal transform block interposed between said selected sub-band image signal and said variable length coding means.

8. The encoder of claim 1 wherein said prediction means comprises:
   variable length decoding means responsive to said coding means;
   inverse orthogonal transform means responsive to said variable length decoding means; and
   a plurality of prediction encoding means, each responsive to said inverse orthogonal transform means and to a different one of said other ones of said sub-band image signals.

9. The encoder of claim 8 wherein said prediction encoding means comprises:
   a filter responsive to said inverse orthogonal transform means for developing a best estimate of the sub-band image signal applied to said prediction encoding means,
   means for comparing said appied sub-band image signal to said best estimate, and
   means for developing a code signal responsive to output signal of said means for comparing.

10. The encoder of claim 9 wherein a threshold circuit is interposed between said means for developing a best estimate and said means for developing a code signal.

11. The encoder of claim 1, further comprising:
    synthesis means responsive to output signal of said coder means and to output signals of said prediction coding means; and
    synthesis comparison means responsive to the signal applied to said filter bank means and to an output signal of said synthesis means; and
    coding means responsive to said synthesis comparison means for developing enhanced synthesis output codes.

12. The encoder of claim 1 wherein said applied image signal is a sub-band image signal obtained from a second filter bank that develops sub-band image signals in addition the sub-band image signal applied to said encoder, the sub-band image signals of said second filter bank being connected to a second prediction coding means, and the second prediction coding means being additionally responsive to output signals of said encoder.

13. An image encoder comprising:
    filter bank means responsive to an applied image signal for developing a plurality of sub-band image signals;
    coder means responsive to a selected one of said sub-band image signals for encoding said selected sub-band image signal to reduce data redundancy contained in said selected sub-band image signal; and
    prediction means responsive to other ones of said sub-band image signals and to said means for encoding for developing predictive signals corresponding to said other sub-band image signals, WHEREIN
    said coder means comprises;
    second filter bank means responsive to signal applied to said coder means for developing a plurality of secondary sub-band image signals;
    second coder means responsive to a selected one of said secondary sub-band image signals for encoding said selected secondary sub-band image signal to reduce data redundancy contained in said selected secondary sub-band image signal; and
    second prediction means responsive to other ones of said secondary sub-band image signals and to said second means for encoding for developing predictive signals corresponding to said other secondary sub-band image signals.

\* \* \* \* \*